United States Patent
Hirata

(10) Patent No.: US 9,668,259 B2
(45) Date of Patent: May 30, 2017

(54) SMALL-SCALE BASE STATION, COMMUNICATION SYSTEM, AND COMMUNICATION METHOD

(71) Applicant: FUJITSU LIMITED, Kawasaki-shi, Kanagawa (JP)

(72) Inventor: Akira Hirata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 380 days.

(21) Appl. No.: 13/895,710

(22) Filed: May 16, 2013

(65) Prior Publication Data

US 2014/0044059 A1    Feb. 13, 2014

(30) Foreign Application Priority Data

Aug. 7, 2012    (JP) .................................. 2012-174624

(51) Int. Cl.
*H04W 72/04*    (2009.01)
*H04W 72/08*    (2009.01)
(Continued)

(52) U.S. Cl.
CPC ....... *H04W 72/0446* (2013.01); *H04W 16/10* (2013.01); *H04W 16/32* (2013.01); *H04W 72/00* (2013.01); *H04W 72/082* (2013.01)

(58) Field of Classification Search
CPC ..... H04W 24/00–24/10; H04W 28/04; H04W 72/00–72/12; H04W 88/04–88/06
See application file for complete search history.

(56) References Cited

U.S. PATENT DOCUMENTS 8,260,206 B2    9/2012    Damnjanovic
8,675,605 B2 *  3/2014    Charbit ............ H04W 72/1205
                                                           370/252
(Continued)

FOREIGN PATENT DOCUMENTS

CN    102186247    9/2011
JP    2010-136337    6/2010
(Continued)

OTHER PUBLICATIONS

3GPP TS 36.300 V10.7.0 (Mar. 2012) 3rd Generation Partnership Project; Technical Specification Group Radio Access Network; Evolved Universal Terrestrial Radio Access (E-UTRA) and Evolved Universal Terrestrial Radio Access Network(E-UTRAN); Overall description; Stage 2 (Release 10), http://www.3gpp.org/ftp/Specs/archive/36_series/36.300/36300-a70.zip, 16.1.5 Inter-cell Interference Coordination (ICIC), pp. 116, 20.2.2.6 Load Indication procedure, pp. 157, Annex K (informative):Time domain ICIC, pp. 185.
(Continued)

*Primary Examiner* — Xavier Szewai Wong
(74) *Attorney, Agent, or Firm* — Fujitsu Patent Center

(57) ABSTRACT

A small-scale base station includes a digital signal processor configured to generate subframes of a given number, based on first information unique to the small-scale base station and by providing a portion of the subframes as blank frames into which no information is inserted, such that positions where the blank frames are provided at the subframes form a pattern unique to the small-scale base station; and a central processing unit configured to use the generated subframes and to control data communication with a terminal.

13 Claims, 12 Drawing Sheets

(51) Int. Cl.
*H04W 16/10* (2009.01)
*H04W 16/32* (2009.01)
*H04W 72/00* (2009.01)

(56) References Cited

U.S. PATENT DOCUMENTS

| | | | | |
|---|---|---|---|---|
| 8,755,316 | B2* | 6/2014 | Aschan | H04W 52/0216 370/310 |
| 9,001,756 | B2* | 4/2015 | Chen | H04J 11/0033 370/329 |
| 2009/0097452 | A1 | 4/2009 | Gogic | |
| 2011/0216732 | A1 | 9/2011 | Maeda et al. | |
| 2011/0219226 | A1* | 9/2011 | Olsson et al. | 713/150 |
| 2011/0310830 | A1 | 12/2011 | Wu et al. | |
| 2012/0113843 | A1* | 5/2012 | Watfa | H04W 72/1289 370/252 |
| 2012/0149362 | A1* | 6/2012 | Tooher et al. | 455/423 |
| 2012/0329400 | A1* | 12/2012 | Seo | H04J 11/005 455/63.1 |
| 2013/0045749 | A1* | 2/2013 | Sridhar | H04W 36/0083 455/443 |
| 2013/0170423 | A1 | 7/2013 | Abe et al. | |
| 2013/0225192 | A1 | 8/2013 | Yamamoto et al. | |
| 2013/0242924 | A1* | 9/2013 | Kim et al. | 370/329 |
| 2013/0279419 | A1* | 10/2013 | Li | H04W 24/02 370/328 |
| 2014/0004866 | A1* | 1/2014 | Dalsgaard et al. | 455/450 |

FOREIGN PATENT DOCUMENTS

| | | |
|---|---|---|
| JP | 2011-501526 | 1/2011 |
| JP | 2011-130354 | 6/2011 |
| JP | 2011-518471 | 6/2011 |
| JP | 2011-518519 | 6/2011 |
| JP | 2012-005079 | 1/2012 |
| JP | 2012-005086 | 1/2012 |
| WO | WO-2009-117658 | 9/2009 |
| WO | 2011/162182 A1 | 12/2011 |
| WO | WO-2011-162395 | 12/2011 |
| WO | 2012/063934 A1 | 5/2012 |

OTHER PUBLICATIONS

3GPP TS 36.211 V10.5.0 (Jun. 2012), 3rd Generation Partnership Project; Technical Specification Group Radio Access Network; Evolved Universal Terrestrial Radio Access (E-UTRA); Physical Channels and Modulation (Release 10), http://www.3gpp.org/ftp/Specs/archive/36_series/36.211/36211-a50zip, 6.11 Synchronization signals, pp. 90-94.
3GPP TS 36.331 V10.5.0 (Mar. 2012), 3rd Generation Partnership Project; Technical Specification Group Radio Access Network; Evolved Universal Terrestrial Radio Access (E-UTRA); Radio Resource Control(RRC); Protocol specification (Release 10), http://www.3gpp.org/ftp/Specs/archive/36_series/36.331/36331-a50.zip 6.3.1 System information blocks, pp. 149-164.
CNOA—Office Action of Chinese Patent Application No. 201310268473.5 dated Jan. 4, 2016, with partial English translation of the Office Action.
JPOA—Office Action of Japanese Patent Application No. 2012-174624 dated Jan. 19, 2016, with English Translation of the relevant part, p. 1, line 24 to p. 1, line 28 & p. 2, line 2 to line 29 & p. 3, line 27 to line 31 of the Office Action.
New Postcom, "Consideration on how to get Femto ABS pattern", Agenda Item: 6.3.1, 3GPP TSG RAN WG1 Meeting #66, R1-112653, Athens, Greece, Aug. 22-26, 2011. (two pages).
EESR—European Search Report of European Patent Application No. 13168477.1 dated Dec. 5, 2016.

* cited by examiner

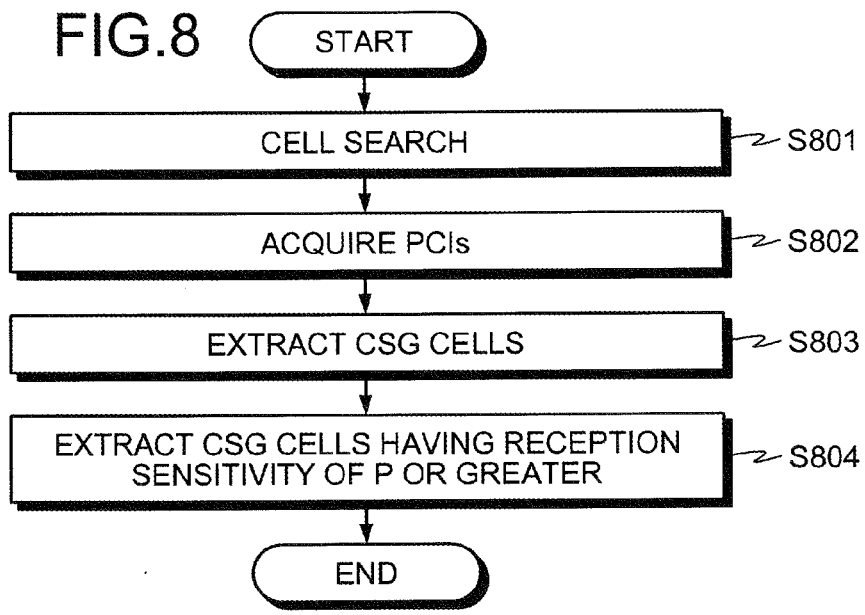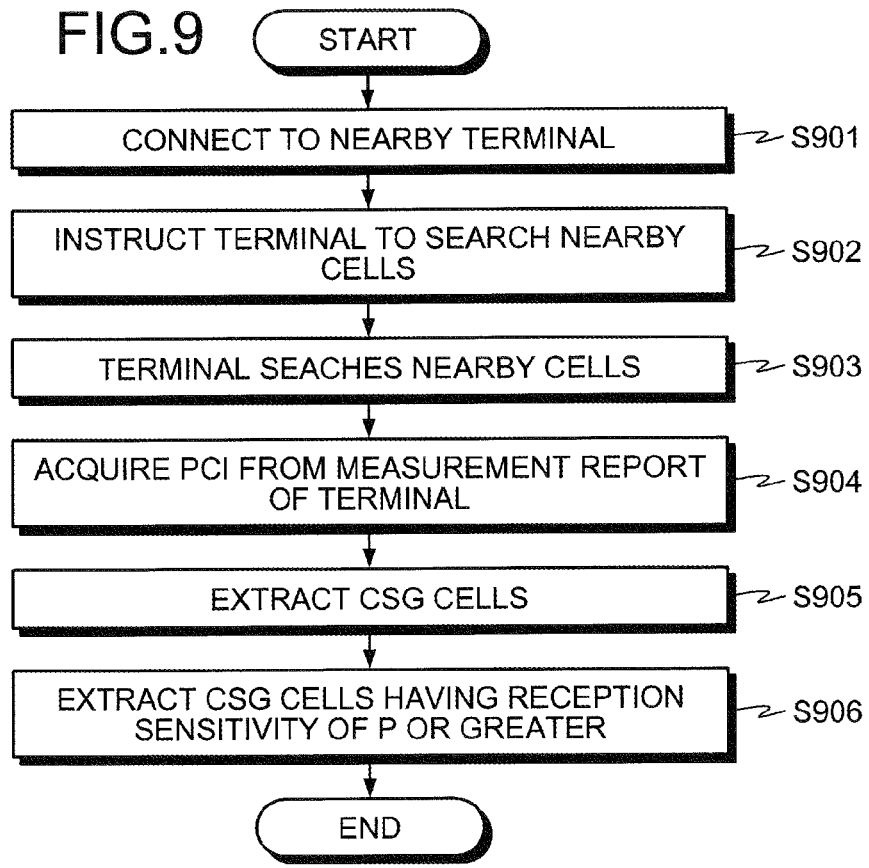

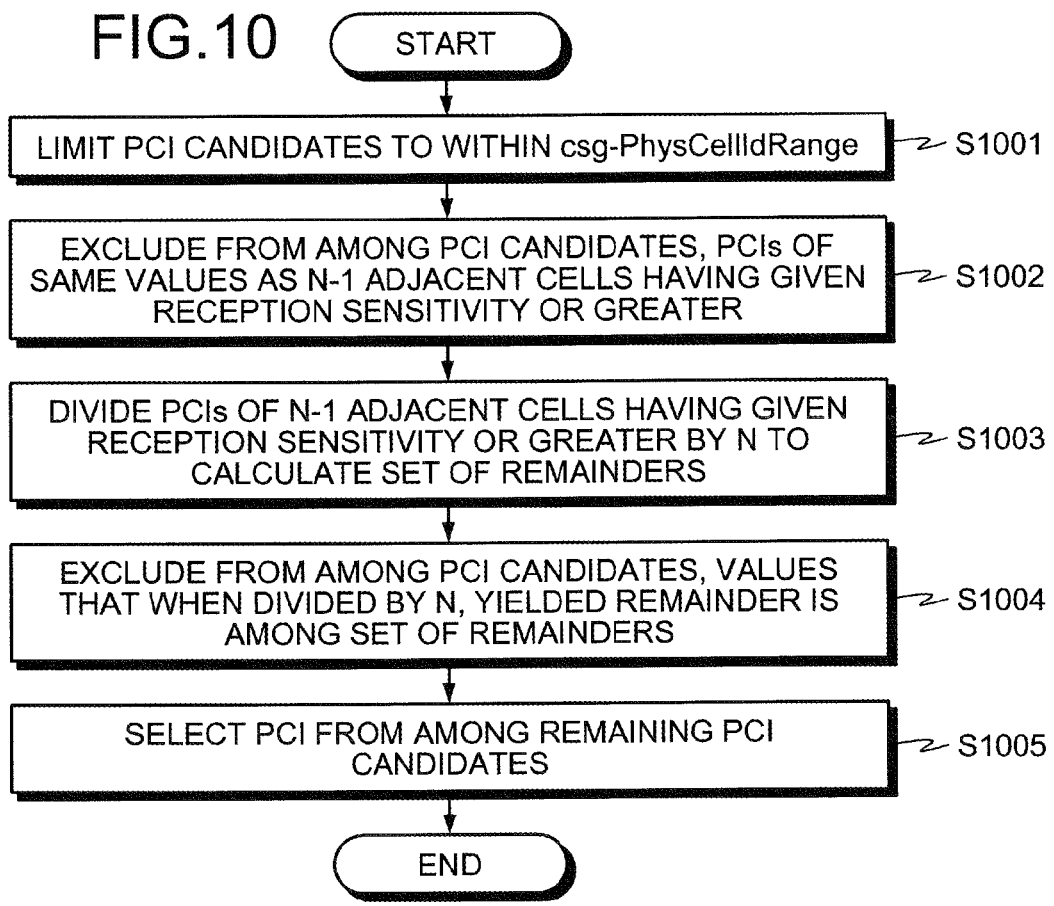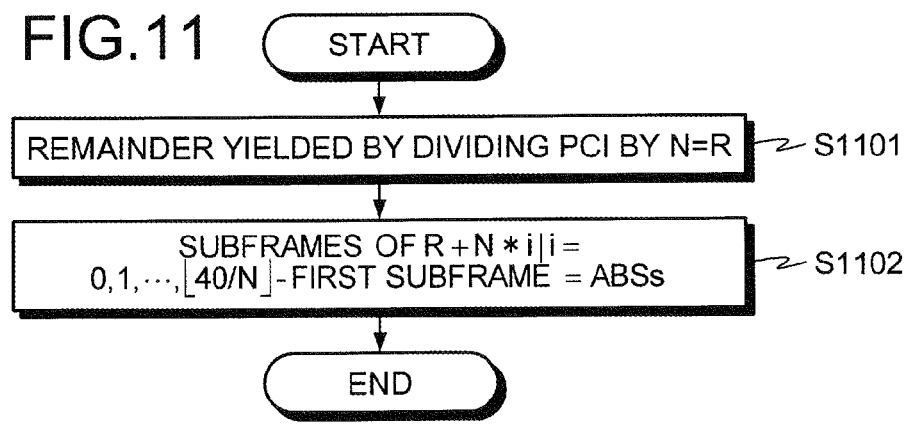

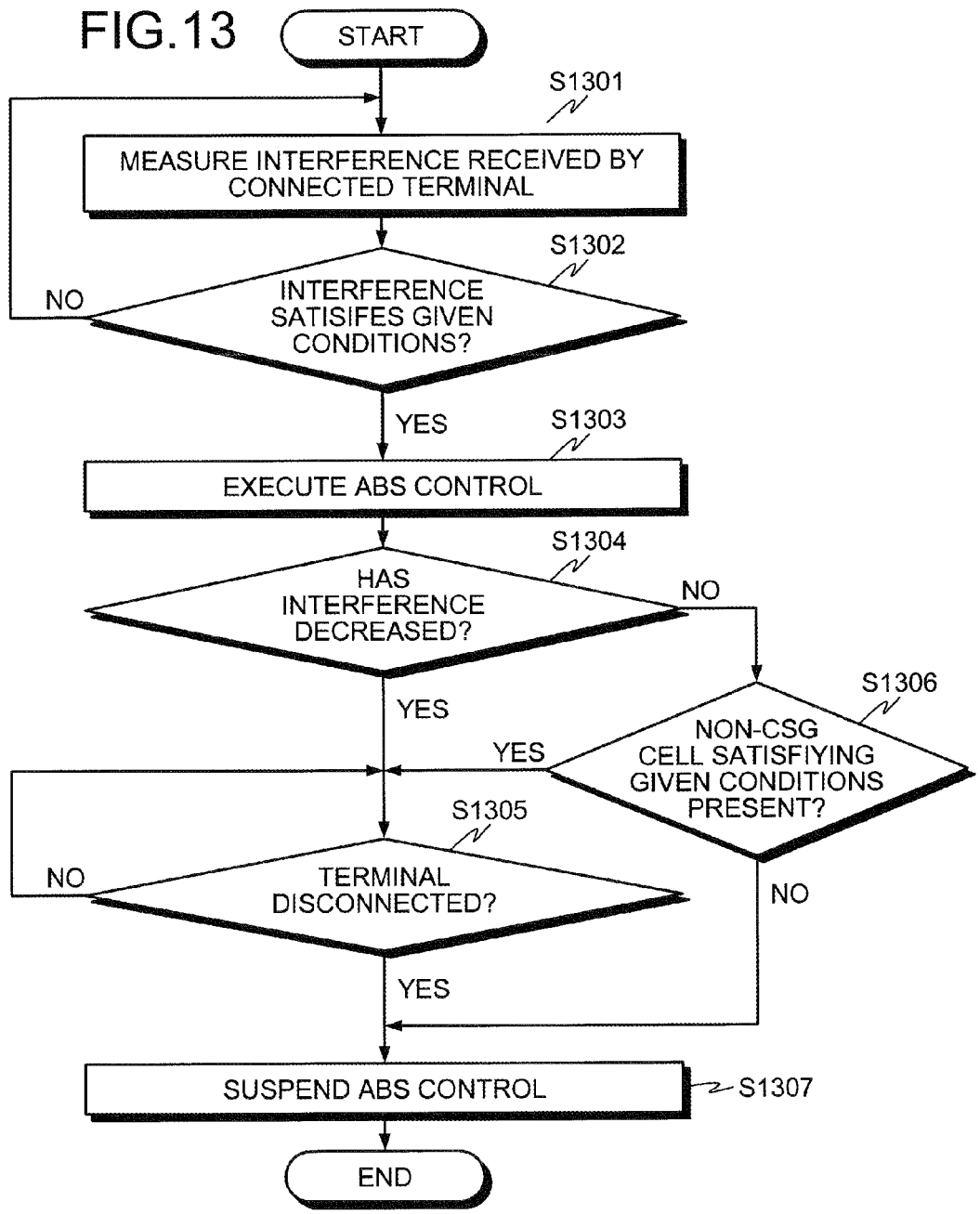

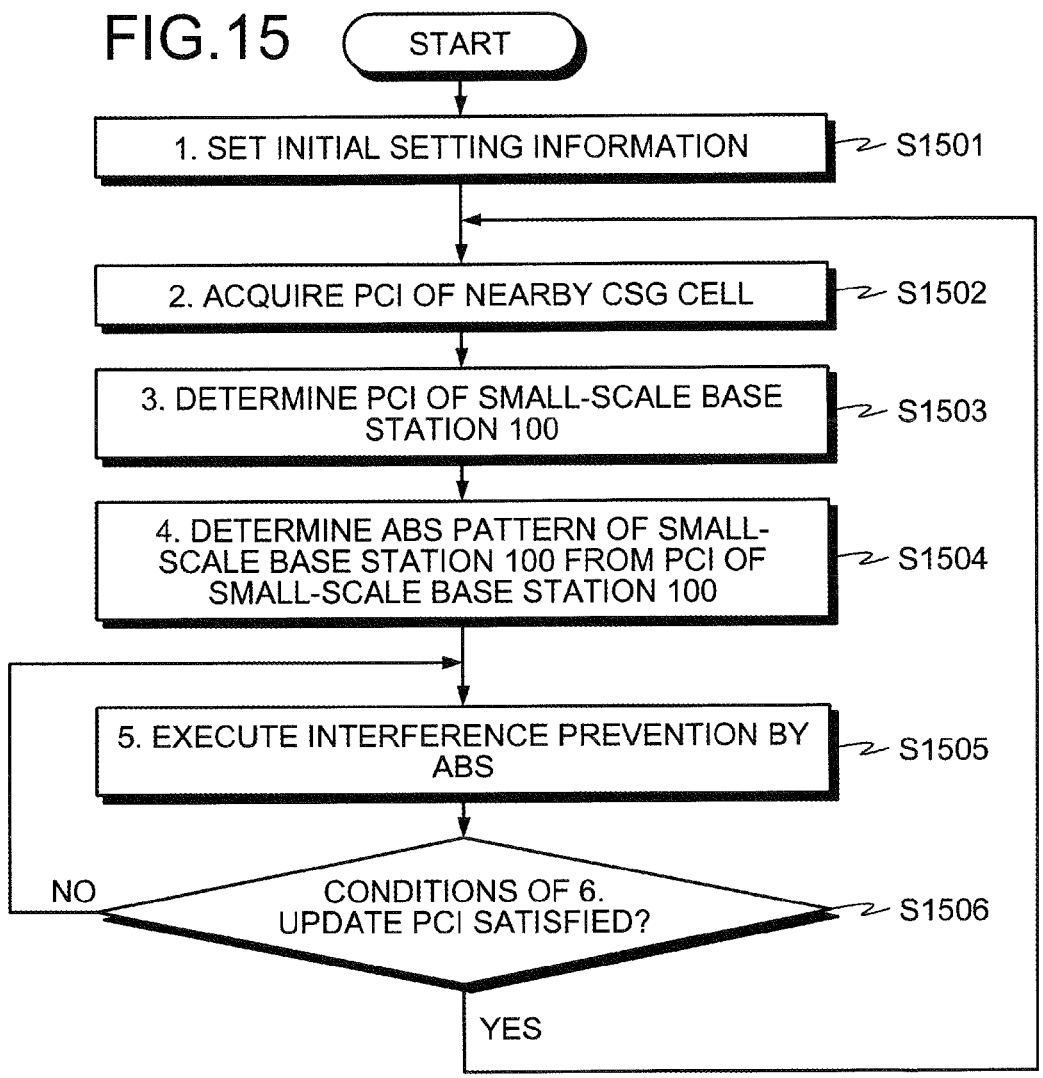

SMALL-SCALE BASE STATION, COMMUNICATION SYSTEM, AND COMMUNICATION METHOD

CROSS REFERENCE TO RELATED APPLICATIONS

This application is based upon and claims the benefit of priority of the prior Japanese Patent Application No. 2012-174624, filed on Aug. 7, 2012, the entire contents of which are incorporated herein by reference.

FIELD

The embodiments discussed herein are related to a small-scale base station, a communication system, and a communication method that reduce interference between adjacent cells.

BACKGROUND

Under the mobile communication standards of the Third Generation Partnership Project (3GPP), Long Term Evolution (LTE) has been proposed for even faster communication. To robustly achieve increases in communication speed consequent to such improvements in communication standards, the amount of communication data handled by one terminal has increased.

To cope with such increases in communication volumes, a small-scale base station (HeNB: Home eNodeB) having a cell (femtocell) of a small radius is provided in the given radius of the macrocell of a base station (eNodeB (eNB)). This small-scale base station is provided at hotspots where many base stations performing communication are present and in dead zones where signals do not reach to improve the communication state in these areas. This small-scale base station has a high degree of freedom in terms of installation location and can be easily installed where necessary.

Among femtocells is a cell that only terminals belonging to a closed subscriber group (CSG), which is a group of pre-registered terminals, can access called a CSG cell. CSG cells use system information block type 1 (SIB1) included in broadcast information and notify nearby terminals of identification information (csg-Identity) of the CSG cell, whereby the terminals can attempt to connect to a connectable CSG cell based on the identification information.

Further, since femtocells assume the use of, as a network-side line (backhaul), a broadband line under individual or corporate contract, a majority of femtocells are assumed to be operated as CSG cells.

Communication with counterpart terminals is subject to interference by signals of adjacent cells. Interference between adjacent cells causes drops in communication quality and therefore, various types of techniques have been proposed to prevent interference. As one technique to reduce interference under the 3GPP (Release10) communication standard, enhanced intercell interference coordination (eICIC) has been specified. Based on 1-ms subframes as a unit of time, an eNB manages radio resources used in cellular communication. A cell performing normal communication transmits and receives data at each subframe. Under eICIC, if a terminal connected to cell A receives interference from cell B, which is adjacent to cell A, the base station (eNB2) of cell B implements an almost blank subframe (ABS) where for a portion of the subframes of cell B, substantially no data is transmitted or received. As a result, cell A and the terminal communicate during the implementation of ABS by cell B, whereby interference can be reduced. However, for cell A and the terminal to communication at the timing of ABS implementation by cell B, the base station (eNB1) of cell A has to know the timing of ABS by cell B.

Usually, adjacent base stations are connected by an X2 interface. The base station (eNB1) specifies ABS information in a message (parameter Invoke Indication of LOAD INFORMATION) on the X2 interface whereby, the base station (eNB1) requests the base station (eNB2) for ABS parameters of cell B. Having received the request, the base station (eNB2) sets given ABS parameters for cell B in a message (parameter ABS Information of LOAD INFORMATION) and sends the message to the base station (eNB1). The base station (eNB1) receives the message and communicates with the terminal in cell A, based on the received ABS parameters.

The base station (eNB2) can use a message (RESOURCE STATUS REQUEST) on the X2 interface to inquire about the utilization state of the ABS reported to the base station (eNB1). The base station (eNB1) can use a message (RESOURCE STATUS RESPONSE, RESOURCE STATUS FAILURE and RESOURCE STATUS UPDATE) on the X2 interface to reply to the base station (eNB2) concerning the inquiry. Under the communication standard 3GPP, an ABS pattern to be used by a cell is notified from a management apparatus, such as an eNodeB Management System (eMS), to a base station (eNB) and can also be specified.

Although an ABS is a subframe carrying substantially no information, an ABS includes a cell reference signal (CRS), which is information for measuring cell reception quality. Further, an ABS includes a paging, positioning reference signal (PRS) for synchronization as well as reporting and managing packet reception, a primary synchronization signal (PSS), a secondary synchronization signal (SSS), and a physical broadcast channel (PBCH), enabling transmission of related information. The timing of a subframe to be an ABS is presently specified as a recursive pattern of 40 ms cycles, and thus, given ABS patterns using 40 subframes are created. In the description hereinafter, an ABS, in addition to the ABS above, is a multimedia broadcast-multicast service single frequency network (MBSFN) subframe that can be used as an ABS, and includes subframes that compared to normal subframes are extremely poor at suppressing transmission output.

For cases where a microcell such as a femtocell is arranged in a macrocell, techniques have been proposed that prevent interference between the respective base stations of the macrocell and femtocell. According to one such technique, a terminal located in a microcell of a macrocell transmits interference power information to the macrocell base station and the macrocell base station notifies the concerned microcell base station of the information, whereby the microcell base station uses a transmission frame capable of reducing the interference (see, for example, Japanese Laid-Open Patent Publication No. 2012-5079).

According to another technique, a microcell base station detects uplink interference of a terminal connected to a macrocell base station and notifies the macrocell base station of the interference pattern. The macrocell base station notifies the microcell base station of scheduling information for a user terminal, based on the interference pattern; and based on the scheduling information, the microcell base station, performs scheduling of the terminal (see, for example, Japanese Laid-Open Patent Publication No. 2012-5086).

A further technique uses ICIC information over an X2 interface or an S1 interface between a macrocell base station and a microcell base station; by a high interference indicator (HII), identifies a frequency resource subject to interference; and performs resource reservation (see, for example, Published Japanese-Translation of PCT Application, Publication No. 2011-518519).

Another technique searches for a CSG cell adjacent to a terminal WTRU, reads a master information block (MIB) and a system information block (SIB), and determines whether intermittent reception (DRX gap) is sufficient for this reading. If the DRX gap is insufficient, detuning from the cell is performed and the MIB and the SIB are read (see, for example, Published Japanese-Translation of PCT Application, Publication No. 2011-518471).

With respect to the base station of a CSG cell and of a non-CSG cell, a further technique issues a CSG-ID to a terminal permitted to use the CSG cell, thereby enabling the terminal to access the base station of the CSG cell (see, for example, Japanese Laid-Open Patent Publication No. 2010-136337).

Nonetheless, compared to the macrocell base station of a macrocell in which a femtocell is located, a small-scale base station (HeNB) having a cell of a small diameter can be installed dynamically without fixing its location and on this point, differs from base stations (eNB) having macrocells that are fixed in urban areas. Thus, proper management of the installation location of small-scale base stations is difficult and at an eNB and a HeNB, the maintenance of accurately set adjacent cell information related to a femtocell is difficult. In addition, configuration may be such that a small-scale base station does not have an X2 interface for exchanging information with an adjacent cell.

FIGS. 16A and 16B are diagrams for describing a problem accompanying movement of a femtocell. As depicted in FIGS. 16A and 16B, under the 3GPP communication standards, an X2 interface is limited to only opposing HeNBs. However, a HeNB typically provided in a household or place of business has a cell range of several dozen meters. Therefore, the HeNB of a femtocell 1601 depicted in FIG. 16A may be frequently moved to an installation position beyond the range of the cell as depicted in FIG. 16B. In such a case, even if the X2 interface is temporarily provided in the femtocell, it is difficult to accurately discern the adjacent cells.

In residential apartment complexes and business complexes, when an HeNB (cell B) is installed near another HeNB (cell A), communication with terminal A in cell A interferes with the communication with terminal B in cell B. Conversely, the communication with terminal B in cell B interferes with the communication with terminal A in cell A. As described, a femtocell is assumed to be operated as a CSG cell in most cases and therefore, when an adjacent cell is a femtocell, even if the interference is great, a switching, by handover, of connection to the cell causing the interference may not occur.

Concerning such interference, a preventative measure applying ABS is assumed. However, as described, when HeNBs have no X2 interface, the HeNBs cannot notify one another of each other's respective ABS pattern via the X2 interface. As a result, cell A and cell B can conceivably apply ABS concurrently, hindering effective prevention of interference. When there are 3 or more adjacent CSG cells, the timing of the ABS between the CSG cells becomes further overlapped and even if a management apparatus such as a Home eNodeB Management System (HeMS) is configured to notify each CSG cell of the ABS patterns, as described, a cell recognized by the HeMS to be adjacent may not coincide with an actual HeNB that is physically adjacent, arising in a problem that interference cannot be prevented.

SUMMARY

According to an aspect of an embodiment, a small-scale base station includes a digital signal processor configured to generate subframes of a given number, based on first information unique to the small-scale base station and by providing a portion of the subframes as blank frames into which no information is inserted, such that positions where the blank frames are provided at the subframes form a pattern unique to the small-scale base station; and a central processing unit configured to use the generated subframes and to control data communication with a terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a flowchart detailing a process executed by the small-scale base station to acquire the PCI of an adjacent cell;

FIG. 9 is a flowchart detailing a process executed by the small-scale base station to acquire the PCI of an adjacent cell via a terminal;

FIG. 10 is a flowchart detailing a process executed by the small-scale base station to set the PCI thereof;

FIG. 11 is a flowchart detailing a process executed by the small-scale base station to determine the ABS pattern thereof from the PCI thereof;

FIG. 13 is a flowchart depicting details of ABS control executed by the small-scale base station;

FIG. 15 is a flowchart of an overall process of interference prevention control.

DESCRIPTION OF EMBODIMENTS

Figure 1:
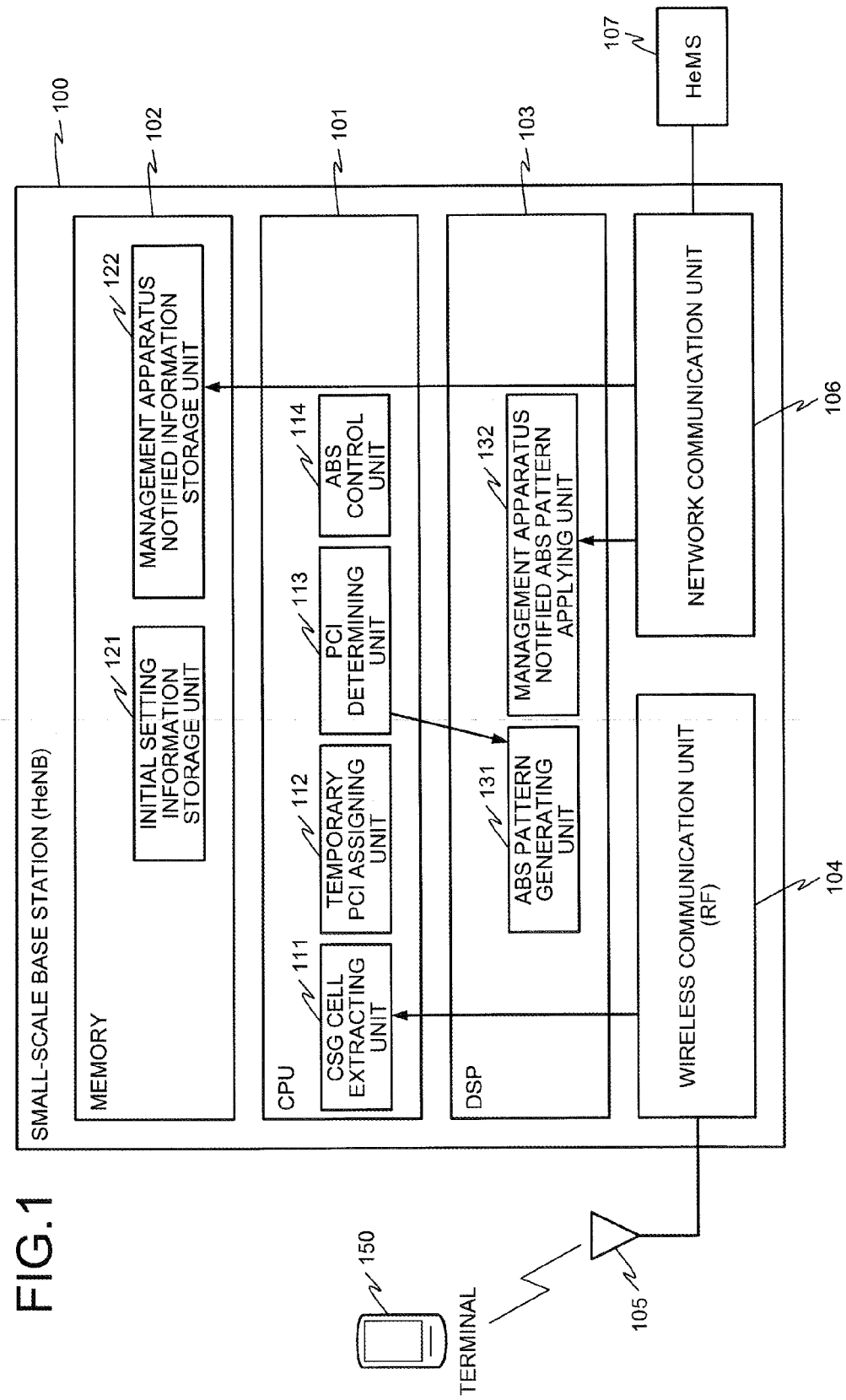
FIG. 1 is a block diagram of a configuration example of a small-scale base station according to an embodiment.

Preferred embodiments of the present invention will be explained with reference to the accompanying drawings. FIG. 1 is a block diagram of a configuration example of a small-scale base station according to an embodiment. In the present embodiment, a small-scale base station (HeNB) 100 of a femtocell (CSG cell) will be described as an example.

The small-scale base station 100 includes a CPU 101, memory 102 including ROM and/or RAM, a digital signal processor (DSP) 103, a wireless communication unit (RF) 104 that wirelessly communicates with a terminal 150 via an antenna 105, and a network communication unit 106 that communicates with other small-scale base stations 100*a* via a network. The network communication unit 106 communicates with a management apparatus 107 such as a HeMS, via the network.

The CPU 101 functions as a control unit administrating overall control of the small-scale base station 100. The memory 102 includes ROM, RAM, HDD, etc., and for example, the ROM stores a control program of the CPU 101 and the RAM is used as a work area and for storing setting information. The CPU 101 to the network communication unit 106 are connected by a non-depicted bus.

The CPU 101 includes functions of a CSG cell extracting unit 111, a temporary physical cell identity (PCI) assigning unit 112, a PCI determining unit 113, and an ABS control unit 114. The CPU 101 provides these functions by executing a control program.

The CSG cell extracting unit 111 has a function of performing sniffing or a function of acquiring the PCI of an adjacent cell from a measurement report reported by the terminal 150. The CSG cell extracting unit 111 extracts a nearby CSG cell having a reception sensitivity of P or greater, based on the acquired PCI. The small-scale base station 100 sets the PCI to have a value unique to the small-scale base station 100 (described in detail hereinafter).

The temporary PCI assigning unit 112 assigns a temporary PCI to the small-scale base station 100 in order to determine a PCI of the small-scale base station 100. Based on the acquired PCI of an adjacent cell, the PCI determining unit 113 determines a PCI value for the small-scale base station 100 different from the acquired PCI. The ABS control unit 114 executes ABS control of inserting an ABS among the subframes, based on a generated ABS pattern (and executes suspension control). The ABS control unit 114 inserts an ABS among the subframes of the small-scale base station 100, based on an ABS pattern that does not overlap the timing of an ABS of a nearby cell and prevents the interference discussed above.

The memory 102 includes an initial setting information storage unit 121 and a management apparatus notified information storage unit 122, and stores the information of these storage units. The initial setting information storage unit 121 stores initial information set for controlling interference prevention. The management apparatus notified information storage unit 122 stores initial information notified by the management apparatus 107, such as the HeMS, for controlling interference prevention. The initial setting information storage unit 121 and/or the management apparatus notified information storage unit 122 can be used for storing initial information for controlling interference prevention.

The DSP 103 includes an ABS pattern generating unit 131 and a management apparatus notified ABS pattern applying unit 132, and executes a function specialized for generating ABS patterns. The ABS pattern generating unit 131 generates an ABS pattern based on the PCI set by the PCI determining unit 113. Capable of receiving ABS pattern information from the management apparatus 107 such as the HeMS, the management apparatus notified ABS pattern applying unit 132 receives the ABS pattern information. The ABS pattern generating unit 131 and/or the management apparatus notified ABS pattern applying unit 132 can be used to generate an ABS pattern for the small-scale base station 100. In the present embodiment, although description has been given where the DSP 103 generates the ABS pattern, ABS pattern generation is not limited to a DSP and may be generated by the CPU 101.

Figure 2:
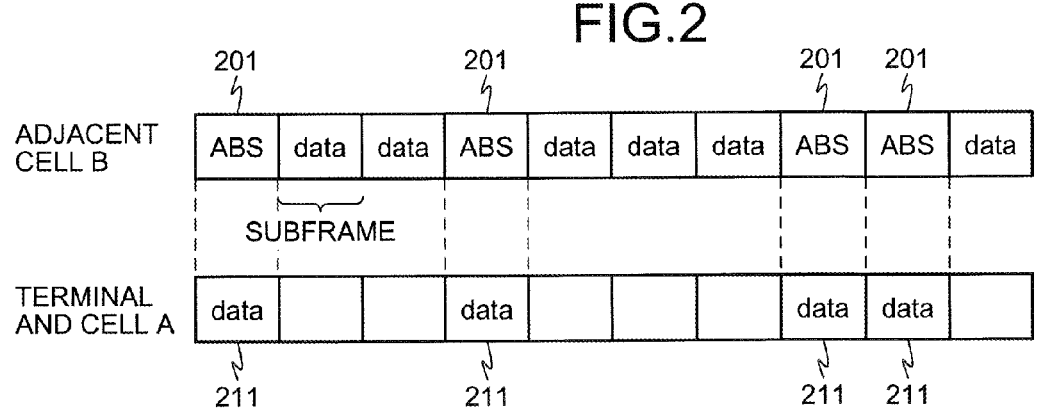
FIG. 2 is a diagram of an example of an ABS pattern.

FIG. 2 is a diagram of an example of an ABS pattern. Under eICIC, if the terminal 150 connected to the base station of cell A is subject to interference from cell B, which is adjacent to cell A, the base station of cell B implements an ABS 201 where for a portion of the subframes of cell B, substantially no data is transmitted or received. The ABS 201 is during a time interval that does not cause interference to the adjacent cell A. The base station of cell A and the terminal 150 communicate data 211 to coincide with the timing of the ABS 201 of cell B, whereby communication between the base station of cell A and the terminal 150 can be performed without receiving interference from cell B. During this time, cell B is also not affected by interference.

Figure 3:
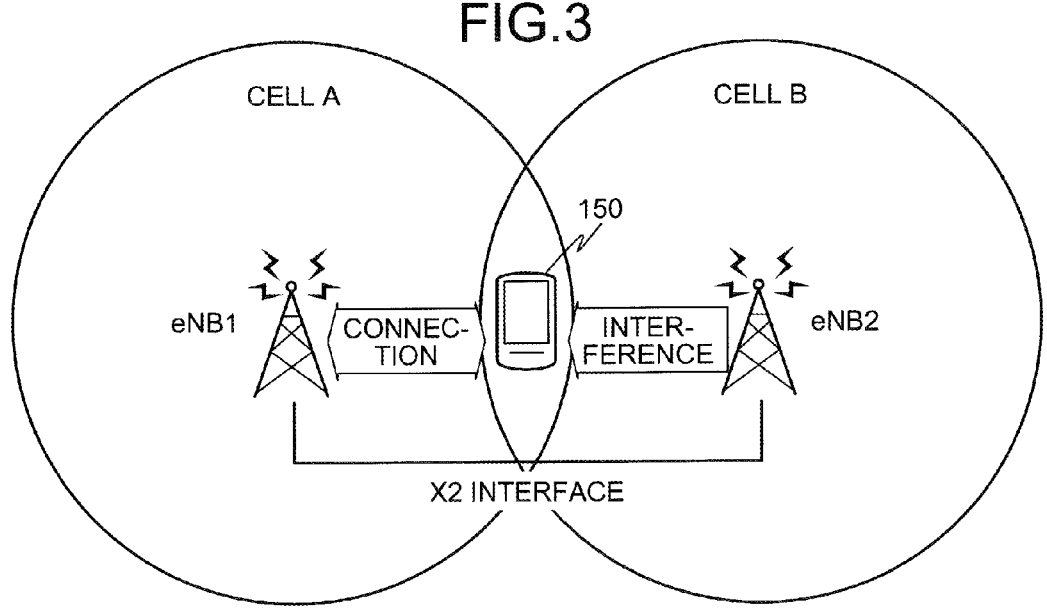
FIG. 3 is a diagram depicting an example of a configuration that reduces interference by giving ABS notification between macrocells.

FIG. 3 is a diagram depicting an example of a configuration that reduces interference by giving ABS notification between macrocells. The base stations (eNB) of cells A and B in FIG. 3 have macrocells and are respectively connected by an X2 interface. The base station (eNB2) of cell B can give notification of information concerning the ABS 201, via the X2 interface.

Although a base station of the embodiment is a small-scale base station of a femtocell, the small-scale base station 100 of cell A performs control such that with respect to communication with the terminal 150, the transmission timing differs from the transmission timing of the small-scale base station 100*a* of the adjacent cell B. This point will be discussed hereinafter.

Figure 4:
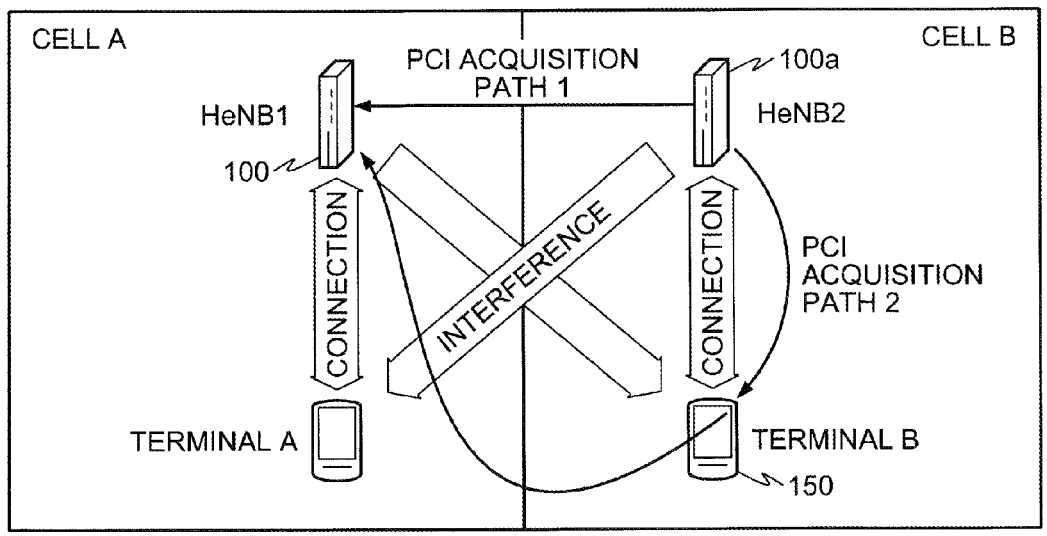
FIG. 4 is a diagram for describing acquisition of unique information of an adjacent cell according to the embodiment.

FIG. 4 is a diagram for describing acquisition of unique information of an adjacent cell according to the embodiment. A state where the small-scale base station 100*a* of cell B is disposed adjacent to the small-scale base station 100 of cell A is depicted. In this case, the communication between cell A and terminal A is subject to interference by the communication between cell B and terminal B; and the communication between cell B and terminal B is subject to interference by the communication between cell A and terminal A. As previously described, the small-scale base stations 100 and 100*a* of the embodiment do not have an X2 interface to mutually communicate directly and therefore, the small-scale base stations 100 and 100*a* cannot notify one another of each other's respective ABS pattern.

The small-scale base station 100 of the embodiment acquires unique information of the adjacent cell B (small-scale base station 100*a*) and consequently, sets an ABS pattern differing from that of cell B. For example, the PCI of the adjacent cell B is used as unique information. The small-scale base station 100 of cell A, by acquiring unique information of the adjacent cell B, as described hereinafter, sets an ABS pattern for the small-scale base station 100 and prevents (controls) interference from the adjacent cell B. Similarly, the small-scale base station 100*a* of the adjacent cell B acquires unique information of cell A and thereby, sets an ABS pattern for the small-scale base station 100*a* and prevents interference from cell A.

Concerning PCI acquisition, the small-scale base station 100 of cell A acquires the PCI of the adjacent cell B directly (acquisition path 1). In the embodiment, the small-scale base station 100 of cell A requests the nearby terminal (terminal B in the example depicted) 150 to acquire the PCI of cell B and the small-scale base station 100 of cell A receives the PCI of the adjacent cell B acquired by terminal B (acquisition path 2).

Figure 5:
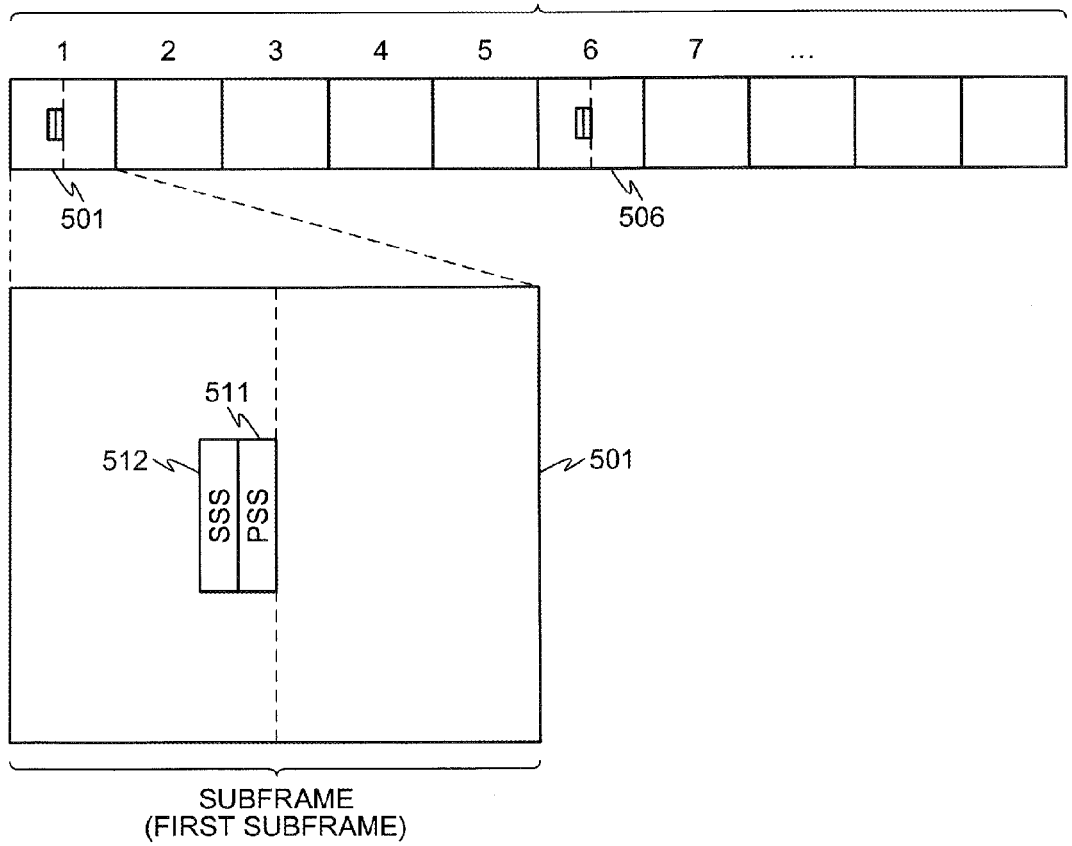
FIG. 5 is a diagram of information for PCI calculation.

A PCI can take on a value of 0 to 503, which are assigned to all cells that include a femtocell, and PCIs are identifiers for identifying respective cells that are adjacent. PCI acquisition specified by current communication standards (3GPP TS36.21-6.11 Synchronization signals) will be described. FIG. 5 is a diagram of information for PCI calculation. FIG. 5 depicts a downlink radio frame of the base station of a macrocell.

For example, the terminal 150 reads out a physical layer ID(0-2) from a PSS 511 included in a first subframe 501 and a sixth subframe 506 of a downlink radio frame 500 of the base station of a macrocell. The terminal 150 reads out a physical layer cell ID group (0-167) from an SS 512 included in the first subframe 501 and the sixth subframe 506 of the downlink radio frame 500. The terminal 150 calculates the PCI of the base station of the macrocell using equation (1).

$$PCI = 3 * \text{physical layer cell ID group} + \text{Physical layer ID} \quad (1)$$

Figure 6:
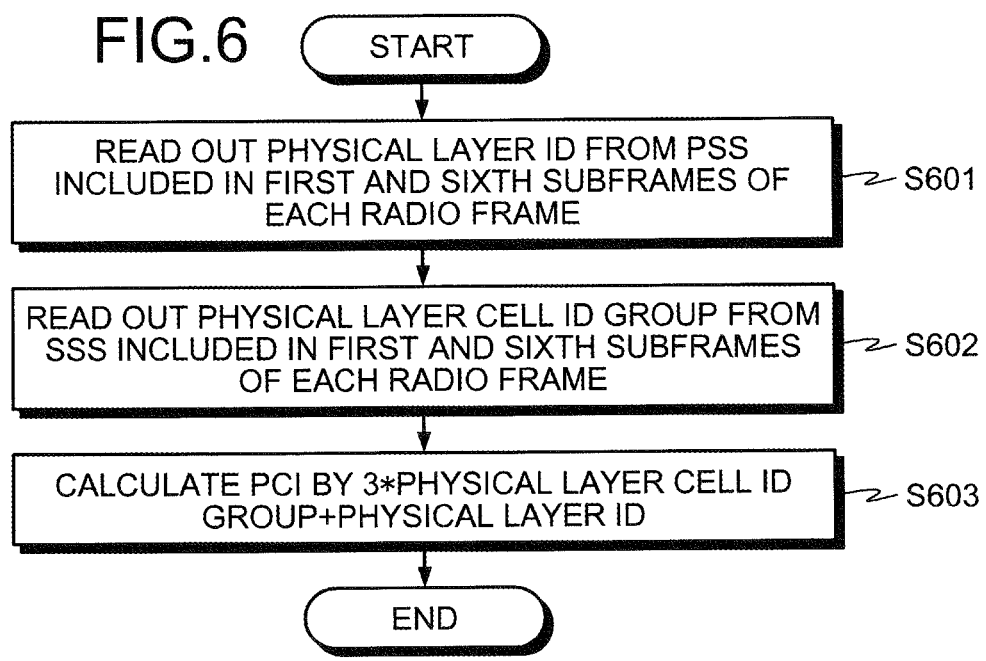
FIG. 6 is a flowchart of an example of a process of acquiring the PCI of an adjacent cell.

FIG. 6 is a flowchart of an example of a process of acquiring the PCI of an adjacent cell. In the present embodiment, by a method identical to the current communication standards above, the PCI of the adjacent cell B (femtocell) 100a is acquired by the terminal 150. Alternatively, the PCI of the adjacent cell B (CSG cell) 100a is acquired by the small-scale base station 100 of cell A (CSG cell). The process depicted in FIG. 6 is executed by the small-scale base station 100 of cell A or by the terminal 150. If the small-scale base station 100 executes the PCI acquisition by the acquisition path 1, the CSG cell extracting unit 111 of the CPU 101 is executed.

An example of the terminal 150 performing PCI acquisition by the acquisition path 2 will be described. The CPU (not depicted) of the terminal 150 reads out the physical layer ID(0-2) from the PSS 511 included in the first subframe 501 and the sixth subframe 506 of the downlink radio frame 500 of the small-scale base station 100a of the adjacent cell B (step S601). The terminal 150 reads out the physical layer cell ID group(0-167) from the SSS 512 included in the first subframe 501 and the sixth subframe 506 of the downlink radio frame 500 (step S602). The terminal 150 executes the calculation of equation (1) and calculates the PCI of the small-scale base station 100a of the adjacent cell B (step S603).

A portion of an interval (e.g., 100-200) in the PCI can be used only by CSG cells and the PCIs that are for CSG cells are set in a csg-PhysCellIdRange of system information block type 4 (SIB4), which is reported information, and notified to nearby terminals by each CSG cell.

Figure 7:
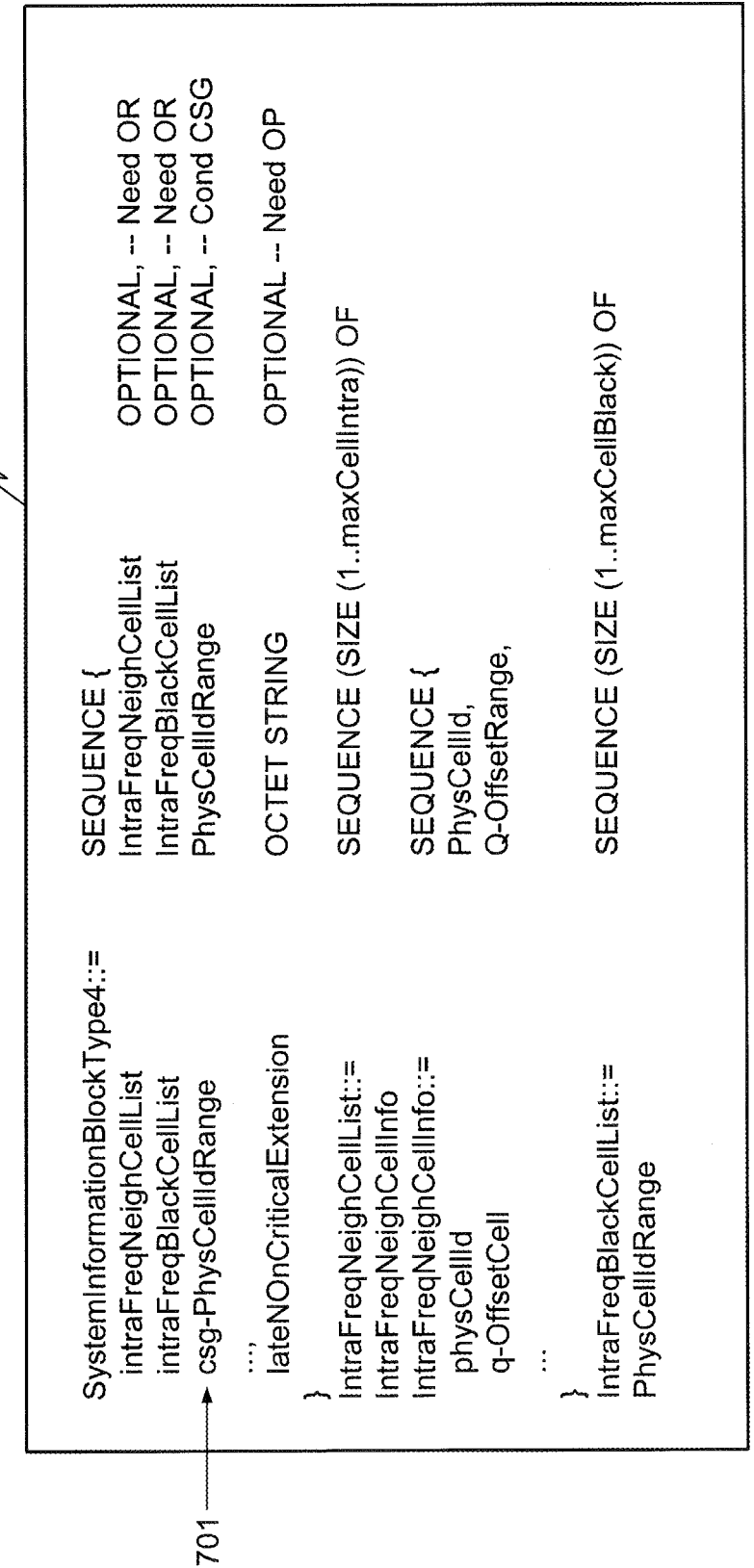
FIG. 7 is a chart depicting SIB4 parameters.

FIG. 7 is a chart depicting SIB4 parameters. FIG. 7 depicts, as an example, parameters 700 of SIB4 specified by current communication standards (3GPP TS36.331-6.3 RRC information elements). Among the parameters 700 of SIB4, a csg-PhysCellIdRange 701 set.

The control of interference prevention in which the small-scale base station 100 of cell A acquires the PCI of the adjacent cell B and generates an ABS pattern unique to cell A is implemented by executing the following processes.
1. Set initial setting information
2. Acquire PCI of nearby CSG cell
3. Determine PCI of small-scale base station 100
4. Determine ABS pattern of small-scale base station 100 from PCI of small-scale base station 100
5. Execute interference prevention by ABS
6. Update PCI The processes 1. to 6. above will be described in detail.
(1. Set Initial Setting Information)

The following initial setting information (required information) a. to d. for performing interference prevention is preliminarily set in the small-scale base station (HeNB) 100. Alternatively, the small-scale base station 100 may receive the information from the management apparatus 107 such as the HeMS and set the information.
a. Maximum count N (where, under current 3GPP standards, N≤9) of CSG cells subject to interference prevention and included in cell of small-scale base station (HeNB) 100
b. CSG cell count M (where, under current 3GPP standards, M≤8=maxcellReport) searched for by small-scale base station (HeNB) 100 or terminal 150
c. Minimum reception sensitivity P of cells subject to interference prevention
d. Process contents (algorithm) for generating ABS pattern (refer to FIG. 2) from PCI of small-scale base station (HeNB) 100

The initial setting information is preliminarily stored to the initial setting information storage unit 121 of the memory 102. The initial setting information can be received from the management apparatus 107 such as the HeMS via the network communication unit 106 and stored to the management apparatus notified information storage unit 122 of the memory 102. The initial setting information of the processes a. to d. above can be stored to the initial setting information storage unit 121 and/or the management apparatus notified information storage unit 122. For example, of the initial setting information for the processes a. to d., a portion can be received from the management apparatus 107 such as the HeMS and updated.
(2. Acquire PCI of Nearby CSG Cell)

The CSG cell extracting unit 111 of the small-scale base station (HeNB) 100, by either of the following methods a. and b., acquires the PCI of a nearby CSG cell (small-scale base station 100a).
a. The small-scale base station 100 directly searches for the PCI of a nearby CSG cell by a sniffing function.
b. The small-scale base station 100 sets a suitable PCI, activates and connects to a communicable terminal 150, and causes the terminal 150 to search for the PCI of a nearby adjacent CSG cell (small-scale base station 100a).

The sniffing function is also called network monitoring and network listening. By the same operations as that of the terminal 150, the small-scale base station 100 implements a function of reading out nearby cell information by wireless communication. Here, the reading out of detailed data like the reading out that an actual terminal performs is not necessary and a function of reading out a PSS and SSS (refer to FIG. 5) for PCI calculation suffices.

FIG. 8 is a flowchart detailing a process executed by the small-scale base station to acquire the PCI of an adjacent cell. If the small-scale base station 100 is equipped with a sniffing function, the CSG cell extracting unit 111 of the small-scale base station 100 acquires the PCI of a CSG cell adjacent to the cell of the small-scale base station 100.

The small-scale base station 100, via the CSG cell extracting unit 111, performs searches equivalent in number to the number of nearby cells M (step S801), acquires the PCI of the searched cells (step S802), and from the acquired PCIs, extracts CSG cells (PCIs are of cells within csg-PhysCellIdRange) (step S803). The small-scale base station 100, via the CSG cell extracting unit 111, extracts from among the CSG cells and in descending order of reception sensitivity, N−1 cells having a reception sensitivity of P or greater (step S804). Here, if N−1 cells having a reception sensitivity of P or greater are not among the CSG cells, small-scale base station 100, via the CSG cell extracting unit 111, extracts all of the cell having a reception sensitivity of P or greater. Under the 3GPP communication standards, the small-scale base station (HeNB) 100 is recommended to have a sniffing function.

FIG. 9 is a flowchart detailing a process executed by the small-scale base station to acquire the PCI of an adjacent cell via a terminal. If the small-scale base station 100 is not equipped with a sniffing function, the small-scale base station 100 acquires the PCI of an adjacent cell through the following operations.

The small-scale base station 100, via the temporary PCI assigning unit 112, sets a suitable (temporary) PCI for the small-scale base station 100, and connects to a suitable nearby communicable terminal 150 (step S901). The CSG cell extracting unit 111 of the small-scale base station 100 instructs the connected terminal 150 to search M nearby cells (instructing by ReportConfig, where under current 3GPP specifications, M≤8) (step S902). In response, the terminal 150 searches nearby cells (step S903).

The small-scale base station 100 acquires the PCI of the nearby cells searched by the terminal 150 (step S904). Here, the CSG cell extracting unit 111 of the small-scale base station 100 acquires the PCIs from a measurement report received from the terminal 150. The small-scale base station 100 extracts CSG cells from the acquired PCIs (step S905). Here, the small-scale base station 100 extracts cells for which the PCI is within the csg-PhysCellIdRange. From among the extracted CSG cells, the CSG cell extracting unit 111 of the small-scale base station 100 extracts in descending order of reception sensitivity, N−1 cells having a reception sensitivity of P or greater (step S906). Here, if N−1 cells having a reception sensitivity of P or greater are not among the CSG cells, CSG cell extracting unit 111 extracts all of the cells having a reception sensitivity of P or greater.

(3. Determine PCI of Small-Scale Base Station 100)

The small-scale base station 100, via the PCI determining unit 113, determines the PCI of the small-scale base station 100. Determination of the PCI of the small-scale base station 100 sets a PCI that satisfies the following conditions a. to c. as the PCI of the small-scale base station 100 and begins signal transmission, where the PCIs of N−1 nearby CSG cells (small-scale base stations 100a) extracted by the above process (refer to FIG. 8 or FIG. 9) is divided by N and the set of remainders is η.

a. Does not overlap with PCI of nearby cell
b. Remainder of PCI divided by N does not belong to set η
c. Is within csg-PhysCellIdRange FIG. 10 is a flowchart detailing a process executed by the small-scale base station to set the PCI thereof. A process performed by the PCI determining unit 113 will be described. The PCI determining unit 113 limits PCI candidates to within the csg-PhysCellIdRange (step S1001) and excludes from among the PCI candidates, PCIs of the same values as the N−1 adjacent cells having a given reception sensitivity or greater (step S1002). The PCI determining unit 113 divides the PCIs of the N−1 adjacent cells having a given reception sensitivity or greater by N to calculate the set η of remainders (step S1003). The PCI determining unit 113 excludes from among the PCI candidates, values that when divided by N, the remainder is among the set η of remainders (step S1004) and selects a PCI from among the remaining PCI candidates (step S1005). The selected PCI becomes the PCI of the small-scale base station 100.

(4. Determine ABS Pattern of Small-Scale Base Station 100 from PCI of Small-Scale Base Station 100)

The small-scale base station 100, via the ABS pattern generating unit 131, generates an ABS pattern from the PCI using a stored algorithm. For example, with respect to numbering from the first cycle of the ABS pattern, subframes regarded as an ABS are defined by:

$$(PCI \bmod N) + N*i | i=0,1,\ldots,\lfloor 40/N \rfloor - 1 \quad (2)$$

Where, N is the cycle of the subframes (e.g., 40).

FIG. 11 is a flowchart detailing a process executed by the small-scale base station to determine the ABS pattern thereof from the PCI thereof. The process performed by the ABS pattern generating unit 131 will be described. The ABS pattern generating unit 131 regards the remainder yielded by dividing the PCI of the small-scale base station 100 by N as R (step S1101) and regards the subframes yielded by equation (2) as ABSs (step S1102). The operation at step S1102 shifts the remainder resulting from dividing the PCI by the N cycles of subframes.

If the PCI is determined by the method above, the ABS pattern corresponding to the PCI is not limited to generation by the ABS pattern generating unit 131 using an algorithm of the small-scale base station 100. For example, the management apparatus 107 such as the HeMS may acquire the PCI of the small-scale base station 100, determine the ABS pattern for the small-scale base station 100 based on the acquired PCI, and notify the small-scale base station 100 of the determined ABS pattern. In this case, the management apparatus notified ABS pattern applying unit 132 of the small-scale base station 100 uses the notified ABS pattern as the ABS pattern in the small-scale base station 100.

An example of ABS pattern generation will be described. The following prerequisites are defined.
1. CSG cell count of cells subject to interference prevention, including cell of small-scale base station 100, is 3
2. csg-PhysCellIdRange=100 to 200.

Regarding PCI determination method:
1. The small-scale base station 100 limits PCI candidates thereof from 100 to 200 based on initial setting information
2. The CSG cell extracting unit 111 searches 2 adjacent CSG cells having strong reception power. Here, the PCIs of the two cells are assumed to be 144 and 173, respectively.
3. The PCI determining unit 113 excludes 144 and 173 from among the PCI candidates.
4. The PCI determining unit 113 divides the PCIs of the two cells by 3 to determine the remainders. Here, the remainders are assumed to be 0 and 2, respectively.
5. The PCI determining unit 113 eliminates values that yield remainders of 0 and 2, from among the PCI candidates.
6. The PCI determining unit 113 selects a PCI. For example, 112 is obtained (the remainder of 112 divided by 3 is 1).

Regarding ABS pattern determination method:
1. The ABS pattern generating unit 131 divides the value (112) of the PCI of the small-scale base station 100 by 3 to obtain the remainder. Here, the remainder is 1.
2. The ABS pattern generating unit 131 defines the ABSs as 1+3*i|i=0, 1, . . . , 12.

Figure 12:
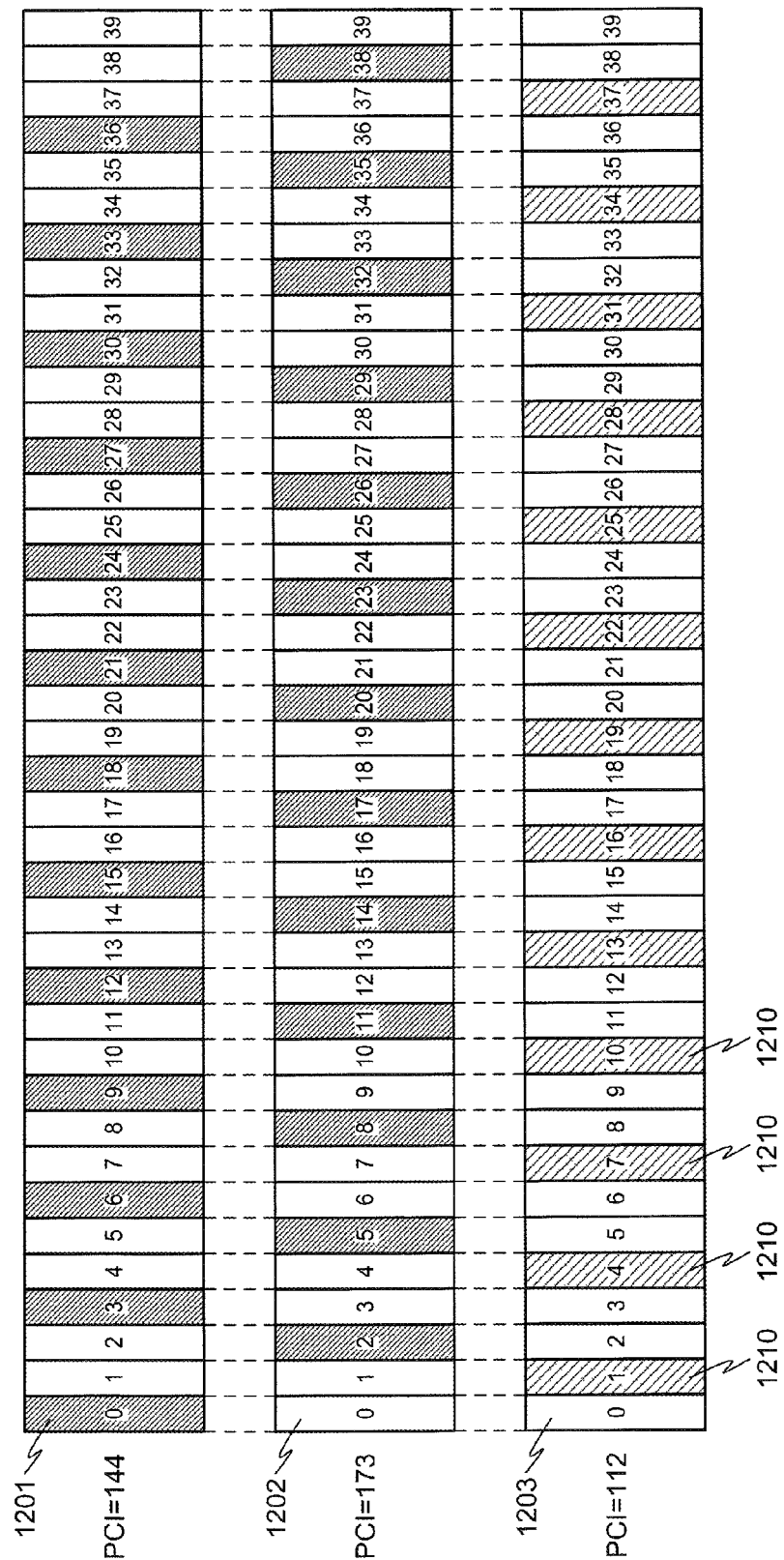
FIG. 12 is a diagram depicting an example of ABS pattern generation for an adjacent cell and for a small-scale base station 100 by the small-scale base station 100.

FIG. 12 is a diagram depicting an example of ABS pattern generation for an adjacent cell and for the small-scale base station 100 by the small-scale base station 100. As above, depicted are the ABS patterns 1201 and 1202 of the CSG cells of two small-scale base stations 100a whose respective PCIs are 144 and 173; and the ABS pattern 1203 of the small-scale base station 100 generated by the method above, where the PCI of the small-scale base station 100 is 112. Hatched areas represent ABSs. The ABSs 1210 of the small-scale base station 100 are transmitted at frames 1, 4, 7, 10, . . . and do not overlap the frames 0, 2, 3, 5, 6, 8, 9, . . . when the ABSs of the ABS patterns 1201 and 1202 of the two small-scale base stations 100a are transmitted.

As depicted in FIG. 12, even when numerous adjacent cells are present, each small-scale base station can set a different ABS pattern among a given number (40) of subframes, thereby enabling reductions in all interference between adjacent cells. Consequently, within the given number of subframes, each small-scale base station can mutually reduce interference and, transmit and receive data.

To implement eICIC, which reduces interference between the small-scale base station 100 and the small-scale base station 100a of an adjacent cell, temporal synchronization has to be established between the small-scale base stations 100 and 100a performing eICIC. To establish temporal synchronization, various techniques can be considered such as a method of synchronizing the small-scale base station 100a of a nearby macrocell with the time of the small-scale base station 100, a method of synchronization with GPS time, and a method of using a given communication procedure (IEEE1588 protocol) for synchronization with a network. For example, Published Japanese-Translation of PCT Application, Publication No. 2011-501526 discloses a technique of synchronizing a femtocell in a 3G system with a macrocell. Using such existing techniques, the small-scale base station 100 can cause temporal synchronization with the small-scale base station 100a of a nearby cell.

(5. Execute Interference Prevention by ABS)

When the terminal 150 connected to the small-scale base station 100 is subject to interference that meets given conditions (e.g., the interference is greater than or equal to a given level), the small-scale base station 100, via the ABS control unit 114, executes ABS control. If the terminal 150 is receiving interference, the potential of a terminal 150 that is communicating with the small-scale base station 100a of another nearby cell being present is high. If a terminal 150 connected to the small-scale base station 100a of another nearby CSG cell is actually present, the terminal 150 and the small-scale base station 100a of the nearby CSG cell also perform ABS control and reduce the interference.

If the interference received by the terminal 150 connected to the small-scale base station 100 decreases, the small-scale base station 100 judges that the interference from the cell of the small-scale base station 100 and received by the terminal 150 connected to the small-scale base station 100a of an adjacent cell has also decreased. In this case, the small-scale base station executes the ABS control until at least completing communication with the terminal 150.

A case where the interference received by the terminal 150 connected to the small-scale base station 100 does not decrease will be described. In this case, at (2. Acquire PCI of nearby CSG cell) above, the CSG cell extracting unit 111 determines whether a nearby non-CSG cell (small-scale base station 100a) that satisfies given conditions (e.g., having a given reception sensitivity or greater) has been detected. If a non-CSG cell has been detected, the small-scale base station 100 determines that the terminal 150 connected to the small-scale base station 100 is receiving interference from the terminal 150 connected to the non-CSG cell. In other words, the small-scale base station 100 determines that the terminal 150 connected thereto is being subject to interference by the terminal 150 connected to the small-scale base station 100a of the non-CSG cell. The small-scale base station 100 executes ABS control until at least completing communication with the terminal 150.

If the interference received by the terminal 150 connected to the small-scale base station 100 does not decrease and no nearby non-CSG cell having a reception sensitivity satisfying given conditions is present, the small-scale base station 100 suspends the ABS control.

FIG. 13 is a flowchart depicting details of the ABS control executed by the small-scale base station. A process performed by the ABS control unit 114 will be described. The ABS control unit 114 measures the interference received by the terminal 150 connected to the small-scale base station 100 (step S1301). The terminal 150 has a function of measuring the interference received and notifies the small-scale base station 100 of the measurement. The small-scale base station 100 determines whether the interference received by the terminal 150 satisfies given conditions (e.g., the level of the interference is greater than or equal to a threshold) (step S1302). If the terminal 150 is not being subject to interference (step S1302: NO), the small-scale base station 100 returns to step S1301. If the terminal 150 is not being subject to interference, the small-scale base station 100 switches to communication that uses normal subframes that do not employ the ABS patterns above, to communication with the terminal 150.

On the other hand, if the terminal 150 is being subject to interference (step S1302: YES), the ABS control unit 114 executes ABS control (step S1303) and determines whether the interference has decreased (step S1304). If the interference has decreased (step S1304: YES), the small-scale base station 100 proceeds to step S1305; and if the interference has not decreased (step S1304: NO), the small-scale base station 100 proceeds to step S1306.

At step S1305, the small-scale base station 100 determines whether the terminal 150 has been disconnected and if the terminal 150 has not been disconnected (step S1305: NO), the small-scale base station 100 continues the ABS control. If the terminal 150 has been disconnected (step S1305: YES), the small-scale base station 100 suspends the ABS control (step S1307).

At step S1306, the small-scale base station 100 determines whether a non-CSG cell (small-scale base station 100a) satisfying given conditions is present. If a non-CSG cell (small-scale base station 100a) satisfying given conditions (e.g., having a given reception sensitivity or greater) is present (step S1306: YES), the small-scale base station 100 proceeds to step S1305 and continues the ABS control. The small-scale base station 100 continues the ABS control because by performing the ABS control, at least the interference received by an adjacent cell can be decreased. On the other hand, if no non-CSG cell satisfying given conditions (e.g., having a given reception sensitivity or greater) is present (step S1306: NO), the small-scale base station 100 proceeds to step S1307 and suspends the ABS control.

The non-CSG cell above refers to a small-scale base station that, like the small-scale base station 100 of the CSG cell of the embodiment, has no function to perform ABS control. If the interference of the small-scale base station executing the ABS control (step S1303) does not decrease (step S1304: NO) and no non-CSG is present in an adjacent cell (step S1306: NO), the small-scale base station determines that even if the ABS control is executed, reductions in interference are not effected and therefore, the small-scale base station suspends the ABS control (step S1307).

(6. Update PCI)

If the small-scale base station 100 determines the ABS pattern thereof based on the PCI thereof, configuration may be such that the PCI is updated at given intervals, which is performed to prevent a phenomenon of ABS pattern overlap described below.

Figure 14C:
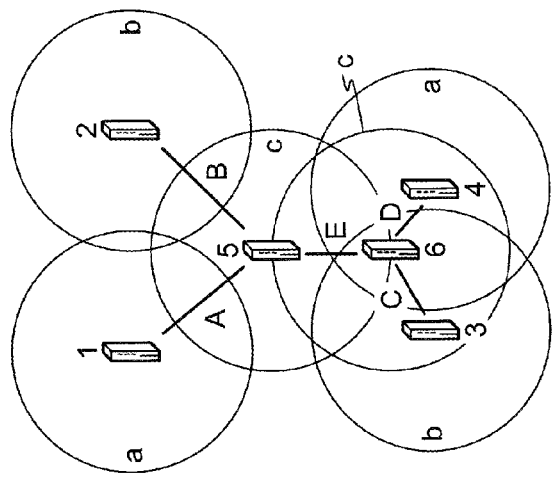
FIGS. 14A, 14B, and 14C are diagrams for describing ABS pattern overlap occurring consequent to an increase in the number of small-scale base stations.
Figure 14B:
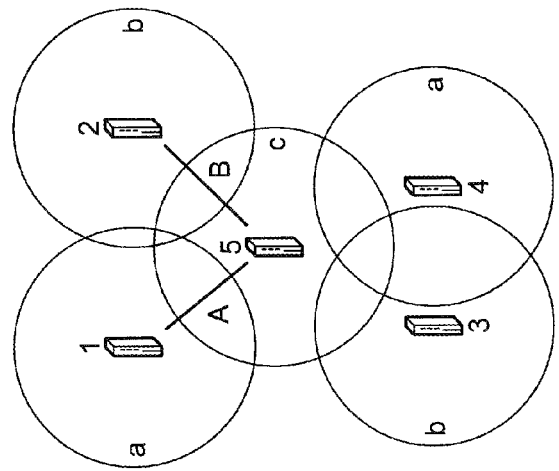
Figure 14A:
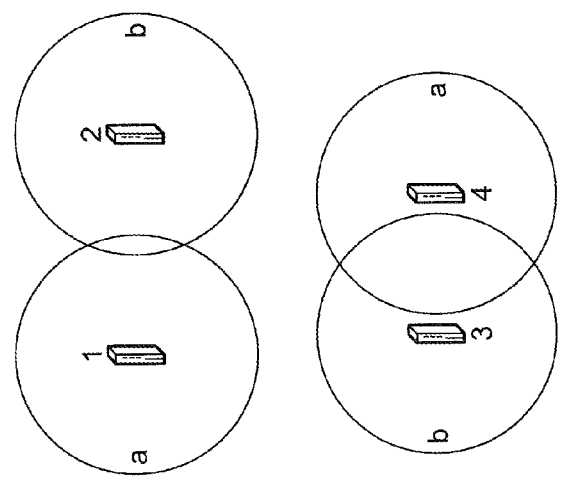
Figure 16A:
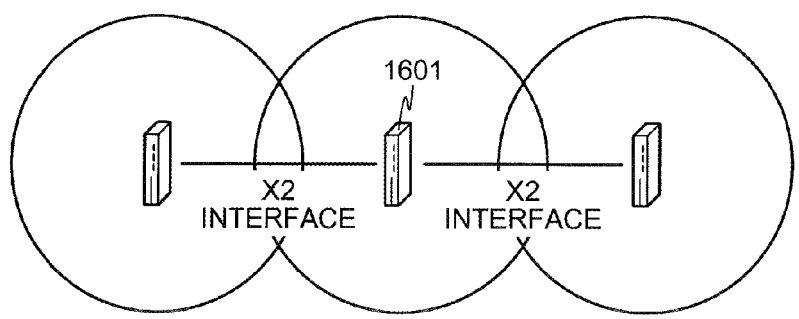
FIGS. 16A and 16B are diagrams for describing a problem accompanying movement of a femtocell.
Figure 16B:
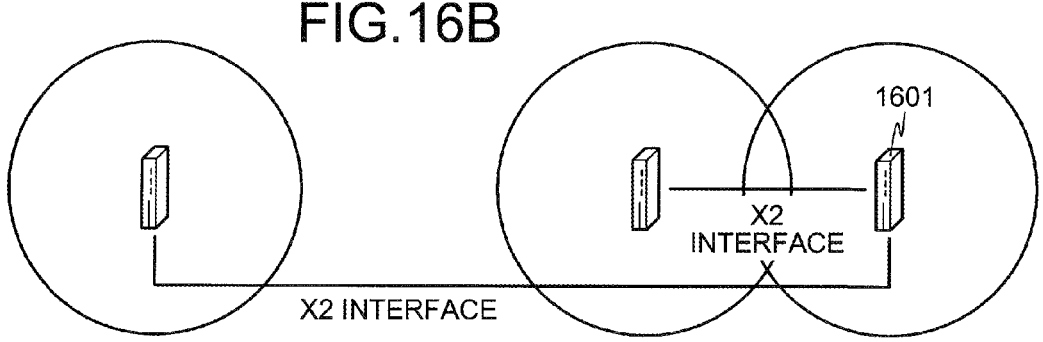

FIGS. 14A, 14B, and 14C are diagrams for describing ABS pattern overlap occurring consequent to an increase in the number of small-scale base stations. Multiple small-scale base stations 100 (cells 1-6) are assumed to be provided by the following procedure.

1. Selection from among 3 ABS patterns a, b, and c for the cells is assumed
2. As an initial state (FIG. 14A), cell 1 having ABS pattern a, cell 2 having ABS pattern b, cell 3 having ABS pattern b, and cell 4 having ABS pattern a are provided.
3. As depicted in FIG. 14B, cell 5 is assumed to be provided between cells 1 to 4. In this case, cell 5 sets a PCI thereof corresponding to ABS pattern c, which differs from that of nearby cell 1 (high reception power) and of cell 2, and generates ABS pattern c.
4. As depicted in FIG. 14C, cell 6 is assumed to be provided between cells 3, 4, and 5. In this case, cell 6 sets a PCI thereof corresponding to ABS pattern c, which differs from that of nearby cell 4 (high reception power) and of cell 5, and generates ABS pattern c.

At step 4., with respect to cell 6, the reception power E of cell 5 is assumed to be less than the reception power C of cell 3 and the reception power D of cell 4. In this case, cell 6 sets ABSs with consideration of cell 5. Therefore, cell 5 and cell 6 have the same ABS pattern c. However, with respect to cell 5, the reception power E of the newly provided cell 6 is greater than the reception power A of cell 1 and the reception power B of cell 2 and thus, is to be subject to interference prevention by ABSs. Therefore, in cell 6, the setting of an ABS pattern different from ABS pattern c is preferable.

To prevent such a state, the small-scale base stations 100 (100a) of each cell, for example, with the following times as conditions, confirm the need to reset the PCI. Here, if resetting is necessary (2. Acquire PCI of nearby CSG cell) to (5. Execute interference prevention by ABS) are performed, and the PCI and the ABS pattern for the cell (the small-scale base station 100) are again set.

When the power supply is again turned ON after being turned OFF

When a given period T has elapsed after setting of PCI for own cell

The period (updating period) T for confirming the need to reset the PCI after the setting of the PCI for the cell suffices to be determined using the PCI at that time. Consequently, the confirmation of the need for PCI resetting can be prevented as much as possible from occurring at the same timing as that in an adjacent cell. For example, the updating period T can be assumed to be T=1 day+(PCI mod 100)min. Configuration may be such that this updating period T is timed by the management apparatus 107 such as the HeMS and the small-scale base station 100 is notified at each updating period.

FIG. 15 is a flowchart of an overall process of interference prevention control. Each of the procedures involved in the interference prevention by the small-scale base station 100 above, including the processes (1. Set initial setting information) to (6. Update PCI) are depicted. The small-scale base station 100 performs (1. Set initial setting information) (step S1501). Subsequently, the small-scale base station 100 performs (2. Acquire PCI of nearby CSG cell) (step S1502), followed by (3. Determine PCI of small-scale base station 100) (step S1503). Next, the small-scale base station 100 performs (4. Determine ABS pattern of small-scale base station 100 from PCI of small-scale base station 100) (step S1504) followed by (5. Execute interference prevention by ABS) (step S1505).

Finally, the small-scale base station 100 determines whether execution of (6. Update PCI) is necessary (step S1506). At step S1506, as described above, if PCI updating conditions are satisfied (step S1506: YES), the small-scale base station 100 returns to step S1502. On the other hand, if PCI updating conditions are not satisfied (step S1506: NO), the small-scale base station 100 returns to step S1505.

According to the embodiment described above, the small-scale base station can set, without connection by an X2 interface, an ABS pattern that does not overlap with the small-scale base station of an adjacent cell. The small-scale base station sets an ABS pattern thereof by acquiring the PCI of the small-scale base station of an adjacent cell, setting a different PCI for the small-scale base station, and setting the ABS pattern, based on the set PCI. Thus, by merely changing the value of the PCI, an ABS pattern that differs from that of the small-scale base station of an adjacent cell can be easily set. The process for setting such an ABS pattern can be implemented by merely adding the above control process at the small-scale base station and can be performed without a need to upgrade other apparatuses such as terminals.

Consequently, each small-scale base station of adjacent cells can set respectively different ABS patterns, whereby interference between the adjacent cells is reduced and, data is transmitted and received. Further, even when numerous adjacent cells are present, each small-scale base station transmits and receives data based on the differing ABS patterns, thereby enabling interference occurring between adjacent cells to be reduced and, data to be transmitted and received.

In the embodiment above, the small-scale base station 100 acquires the PCI of a small-scale base station of an adjacent cell, sets a different PCI as the PCI of the small-scale base station 100, and based on the set PCI, sets an ABS pattern that differs from that of an adjacent cell. However, configuration is not limited hereto. The small-scale base station 100 may acquire, other than the PCI, information that is unique to the small-scale base station and set an ABS pattern, or may use a network address (e.g., MAC address) that is unique to the small-scale base station 100. Furthermore, the small-scale base station 100 may use position information (e.g., longitude and latitude) of the small-scale base station 100. It suffices that the ABS pattern generating unit 131 generates an ABS pattern differing from that of an adjacent cell, based on the unique information of the small-scale base station 100.

The communication method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to one embodiment, the timing at which data is output can be set based on information of adjacent small-scale base stations, to reduce interference mutually occurring between the adjacent cells.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A small-scale base station comprising:
a digital signal processor configured to generate subframes of a given number, based on a first physical cell identity (PCI) unique to the small-scale base station and by providing a portion of the subframes as blank frames into which no information is inserted, such that positions where the blank frames are provided at the subframes form a pattern unique to the small-scale base station; and
a central processing unit configured to use the generated subframes and to control data communication with a terminal, wherein
the central processing unit sets the first PCI to be different from one or more second PCIs unique to one or more adjacent small-scale base stations, respectively, by determining a value of the first PCI based on a calculation of remainders, the calculation using each of the one or more second PCIs and a count N of the one or more adjacent small-scale base stations, where N is an integer greater than or equal to one, and
the digital signal processor obtains the positions of the blank frames among the given number of subframes, based on a calculation that shifts a remainder yielded by dividing the set first PCI by a subframe count, and generates the subframes having the blank frames of the pattern unique to the small-scale base station.

2. The small-scale base station according to claim 1, further comprising a radio communication unit configured to acquire the one or more second PCIs.

3. The small-scale base station according to claim 2, wherein the radio communication unit acquires the one or more second PCIs by a sniffing function.

4. The small-scale base station according to claim 2, wherein the central processing unit is further configured to assign a temporary value to the first PCI for connection to the terminal, and
the radio communication unit causes the terminal to acquire the one or more second PCIs and receives the one or more second PCIs from the terminal.

5. The small-scale base station according to claim 4, wherein the central processing unit updates the first PCI at a given updating interval.

6. The small-scale base station according to claim 1, wherein the central processing unit controls the data communication with the terminal, based on input information that is from an external management apparatus and concerns the blank frames of the pattern unique to the small-scale base station.

7. The small-scale base station according to claim 1, wherein the central processing unit, based on notification from the terminal that interference is being received, executes the data communication that uses the subframes that are generated by the digital signal processor and have the blank frames.

8. The small-scale base station according to claim 7, wherein the central processing unit, after the notification from the terminal that interference is being received, continues to execute the data communication that uses the subframes that are generated by the digital signal processor and have the blank frames, until disconnection of the terminal.

9. The small-scale base station according to claim 1, wherein the central processing unit, based on notification from the terminal that interference is not being received, switches to and executes data communication that uses subframes that do not include the blank frames.

10. The small-scale base station according to claim 1, wherein the blank frames use almost blank subframes specified by a communication standard.

11. A communication system including a small-scale base station of which an installation position can be moved and a terminal that performs data communication with the small-scale base station, wherein
the small-scale base station has:
a central processing unit configured to set a first PCI unique to the small-scale base station to be different from one or more second PCIs unique to one or more adjacent small-scale base stations, respectively, by determining a value of the first PCI based on a calculation of remainders, the calculation using each of the one or more second PCIs and a count N of the one or more adjacent small-scale base stations, where N is an integer greater than or equal to one, and
a digital signal processor configured to obtain positions of the blank frames among the given number of subframes, based on a calculation that shifts a remainder yielded by dividing the set first PCI by a subframe count, and generates subframes having blank frames of a pattern unique to the small-scale base station, wherein
the central processing unit uses the generated subframes and controls the data communication with the terminal; and
the terminal acquires the one or more second PCIs and notifies the small-scale base station of the acquired one or more second PCIs.

12. A communication method of a small-scale base station, the communication method comprising:
generating subframes of a given number, based on a first PCI unique to the small-scale base station and by providing a portion of the subframes as blank frames into which no information is inserted, such that positions where the blank frames are provided at the subframes form a pattern unique to the small-scale base station; and
controlling data communication with a terminal by using the generated subframes, wherein
the first PCI is set to be different from one or more second PCIs unique to one or more adjacent small-scale base stations, respectively, by determining a value of the first PCI based on a calculation of remainders, the calculation using each of the one or more second PCIs and a count N of the one or more adjacent small-scale base stations, where N is an integer greater than or equal to one,
obtaining the positions of the blank among the given number of subframes, based on a calculation that shifts a remainder yielded by dividing the set first PCI by a subframe count, and
the generating generates the subframes having the blank frames of the pattern unique to the small-scale base station.

13. The communication method according to claim 12, further comprising acquiring the one or more second PCIs.

* * * * *